Nov. 15, 1949  A. AFRICANO  2,488,154
STRIP PROPELLANT FOR ROCKET PROJECTILES
Filed Oct. 17, 1944

Inventor
ALFRED AFRICANO,
By C. E. Herrstrom & H. E. Thibodeau
Attorneys

Patented Nov. 15, 1949

2,488,154

UNITED STATES PATENT OFFICE 2,488,154

STRIP PROPELLANT FOR ROCKET PROJECTILES

Alfred Africano, Cumberland, Md., assignor to the United States of America as represented by the Secretary of War Application October 17, 1944, Serial No. 558,988

7 Claims. (Cl. 60—35.6)

This invention relates to rockets and more particularly to a new and improved propellant assembly for a rocket motor designed to propel a high explosive grenade.

A rocket motor consists essentially of a combustion chamber preferably of cylindrical configuration in which a propellant material is supported for ignition. The forward part of the rocket motor is generally secured to a suitable "pay load" which in the instant application comprises a high explosive grenade. The opposite end of the rocket motor chamber is provided with a Venturi-like nozzle which may be formed separately and secured to the combustion chamber by being threaded thereto or which may be formed from the walls of the chamber. The nozzle per se consists of a constricted throat to which the walls converge gradually to provide a gradual approach for the gas flow. The flared part of the nozzle provides an exit passage leading from the constricted throat in which the gases of combustion are expanded to increase their velocity of discharge.

The propellants which have been generally used in rocket-motor combustion chambers heretofore consist of cylindrical grains of double-base powder held in place within the rocket motor chamber by a grid trap positioned between the nozzle and chamber. The grid trap is provided with sufficient openings to provide for the flow of gas and at the same time the openings are sufficiently small to prevent the powder grains from being discharged through the nozzle. The propellant which is preferred in rockets of the type to which this invention relates is formed of double-base powder made by either solvent or solventless extrusion. This propellant is characterized by the fact that its plasticity increases with temperature and since in conventional rockets it is supported by having the base of the cylindrical columns rest on the trap it has been discovered that at high temperatures the propellant becomes embedded within the trap openings constricting the flow of gas and causing dangerously high pressures to be built up within the combustion chamber. Furthermore, in rockets which are designed to have a short burning time such as the rockets fired from shoulder gun projectors, a small web propellant must be provided. These small web propellants when made in cylindrical form with a single axial perforation are difficult to trap. They are naturally weak by virtue of the thin web which becomes increasingly thinner as the burning continues, leaving but a thin shell of powder to be supported within the chamber during the acceleration of the rocket. This thin shell when supported on its base by engagement with a grid trap may and frequently does break up when subjected to the accelerating force. This break-up in the propellant increases the burning area, causing an increase in the chamber pressure. Frequently, portions of broken propellant may constrict the flow of gas through the nozzle by being temporarily lodged in the trap openings resulting in still higher pressures. The total result of this propellant break-up is that rather than burning smoothly and regularly at equilibrium pressure, the propellant burns suddenly with explosive violence, bursting the motor chamber.

Accordingly, it is an object of this invention to provide an improved propellant arrangement for a rocket motor.

A further object of this invention is to provide an improved trap for the propellant charge of a rocket projectile whereby the powder grains constituting the charge are supported forwardly in the motor chamber.

A particular object of this invention is to provide thin web propellant grains and a trap supporting such grains forwardly in the motor chamber.

The specific nature of the invention as well as other objects and advantages thereof will clearly appear from a description of a preferred embodiment as shown in the accompanying drawing in which.

Figure 1:
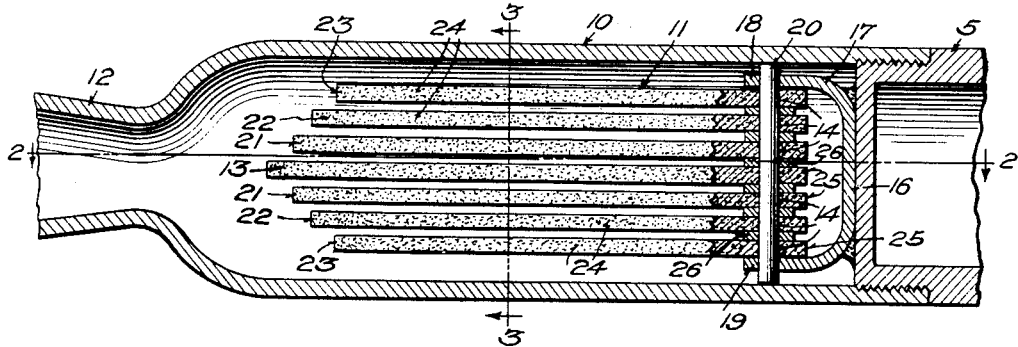
Fig. 1 is an elevational view in longitudinal section of the rocket motor showing the propellant grains in place.
Figure 2:
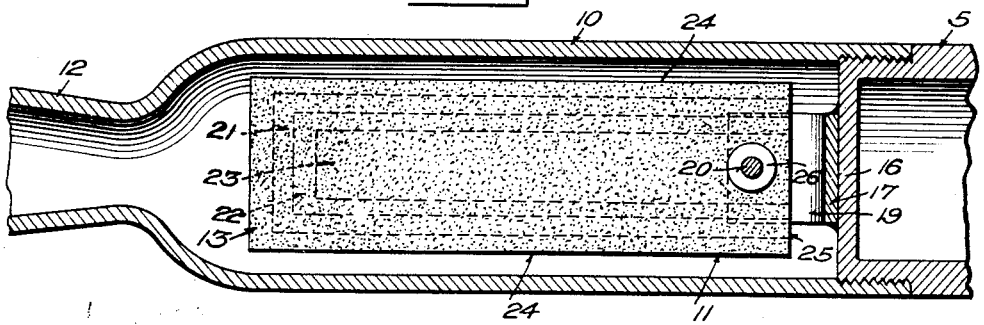
Fig. 2 is a sectional view of Fig. 1 in longitudinal section along the plane 2—2.
Figure 3:
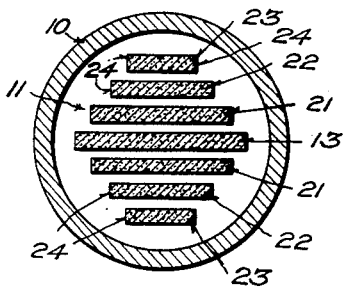
Fig. 3 is a sectional view of Fig. 1, the section being taken on the plane 3—3.

Referring to the drawing, there is shown a motor chamber housing 10 composed of tubular steel or other suitable material capable of withstanding the stresses set up within the chamber as the propellant 11 burns. The front wall of the combustion chamber is defined by the wall of a hollow head 5 threadably secured to the front end of housing 10. Head 5 is adapted to contain high explosive or other "pay load." In the drawing the compartment for the "pay load" is broken away since its features are not involved in this invention. The rear end of housing 10 is shaped to define a nozzle or venturi 12 for the discharge at a high velocity of the combustion gases liberated by the propellant to propel the rocket forward. Obviously, a separate nozzle portion could be substituted for the integral construction shown.

The propellant for the rocket as shown in the drawing consists of a plurality of ribbon-like sheets of propellant material 11 of various widths and lengths. In the construction illustrated, the widest propellant sheet 13 is preferably supported centrally and diametrically of the motor chamber by a rod or pin 20 which extends across the motor chamber at right angles to the plane of the propellant sheet so as to thread through a punched opening 14 of the propellant sheet. This pin 20 is supported at its ends which extend through openings drilled in arms 18 and 19 of a U-shaped member 17 which is suitably secured to a base 16 of the compartment container for the "pay load" as by welding. Sheets 21, 22, and 23 are preferably progressively of smaller width and lesser length than sheet 13 and are also supported by being strung on pin 20 which is secured to the arms 18 and 19 of the U-shaped member 17. Spacers 26, preferably of incombustible material, are provided to separate the sheets of powder.

It is obvious that the individual sheets may be so shaped as to produce a tapered charge such that an increasing free-port area in the direction of gas flow may be easily realized. This invention should not be construed to be limited to sheets of size and shape illustrated in the drawing; in fact a trapezoidally shaped powder sheet may be used to provide the increase in the free-port area.

It may also be pointed out that the powder grains are subjected to vibration with this type of trap and to avoid this the side edges 24 and end edges 25 of the sheet powder strips may be stiffened with a restricting cement to damp the flapping action and to strengthen the sheets.

With the powder grains supported as described, it is to be noted that substantially all the mass of the powder grain is disposed rearwardly of the point of suspension and hence the powder grain is stressed substantially only in tension by the acceleration forces of the rocket projectile.

I claim:

1. In a rocket motor, the combination of a cylindrical housing defining a rearwardly opening combustion chamber, means supporting a rod transversely of said motor chamber near an end thereof, a plurality of ribbon-like strips of propellant material, and means securing a stack of said strips to said rod so that said strips hang longitudinally of the combustion chamber.

2. In a rocket motor the combination of a cylindrical housing defining a rearwardly opening combustion chamber, means supporting a rod transversely of said chamber near the forward end thereof, a propellant comprising a plurality of long grains of a powder composition each having an opening near an end thereof, said propellant grains being supported longitudinally of said chamber by threading said rod through said openings, and means for maintaining said powder grains in spaced relationship on said rod.

3. In a rocket motor the combination of a cylindrical housing defining a rearwardly opening combustion chamber, a plurality of strips of ribbon-like propellant material, means for hanging said strips longitudinally within said chamber, and means for maintaining said strips in spaced relationship.

4. In a rocket motor, the combination of a cylindrical housing defining a rearwardly opening combustion chamber, means supporting a rod transversely of said chamber near the forward end thereof, a propellant comprising a plurality of long grains of a powder composition each having an opening near an end thereof, said propellant grains being supported longitudinally of said chamber by threading said rod through said openings, and a plurality of non-combustible spacers respectively disposed on said rod between successive powder grains whereby said powder grains are maintained in spaced relationship on said rod.

5. A rocket motor comprising in combination a tubular housing defining a rearwardly opening combustion chamber, a propellant comprising a plurality of ribbon-like strips of propellant material, and a rod extending through said ribbon-like strips and transversely of said chamber for securing a stack of said strips longitudinally within said chamber, and a coating of cement-like material applied to the elongated edges of said strips of propellant material whereby said strips are stiffened to resist transverse movement.

6. In a rocket motor, the combination of a housing defining a rearwardly opening cylindrical combustion chamber, means supporting a rod transversely of said motor chamber near the forward end thereof, and a propellant comprising a plurality of long grains of a powder composition each having an opening near an end thereof, said propellant grains being supported longitudinally in said chamber by threading said rod through said openings, and a coating of cement-like material applied to the elongated edges of said powder grains whereby said grains are stiffened to resist transverse movement.

7. The combination defined in claim 3 plus a coating of cement-like material applied to the elongated edges of said strips of propellant material whereby said strips are stiffened to resist transverse movement.

ALFRED AFRICANO.

REFERENCES CITED

The following references are of record in the file of this patent:

UNITED STATES PATENTS

| Number | Name | Date |
|---|---|---|
| 958,990 | Bourdelles | May 24, 1910 |
| 2,145,507 | Denoix | Jan. 31, 1939 |
| 2,215,075 | Weldin | Sept. 17, 1940 |
| 2,371,139 | Adelman | Mar. 13, 1945 |
| 2,398,927 | Farr | Apr. 23, 1946 |